(No Model.)
J. W. LOVIBOND.
TINTOMETER.
No. 451,828. Patented May 5, 1891.
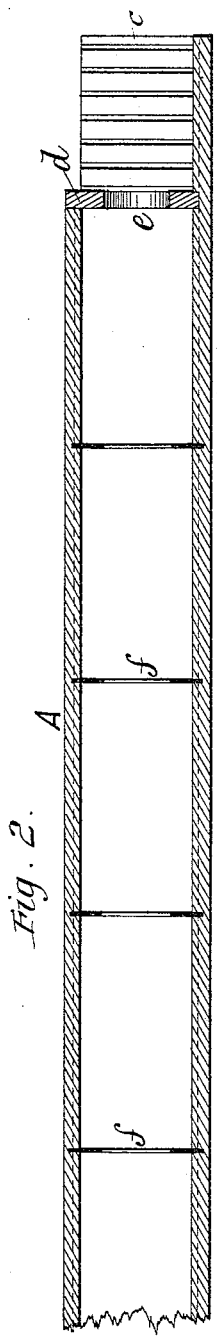
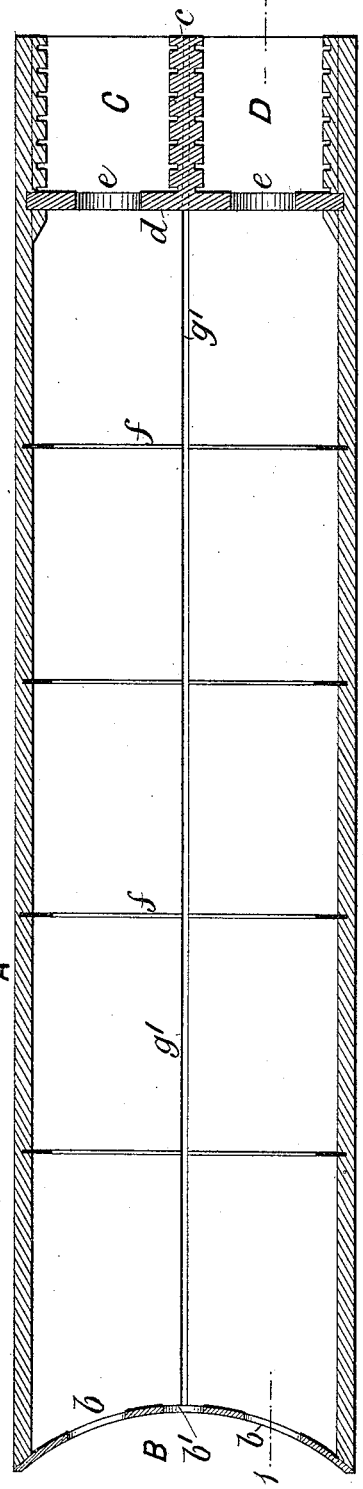
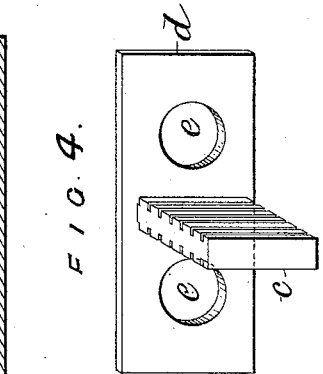
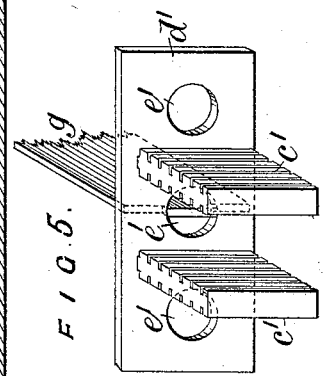
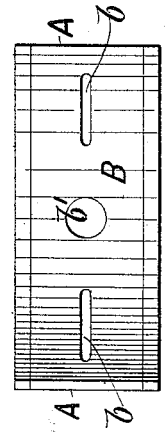

UNITED STATES PATENT OFFICE.

JOSEPH WILLIAMS LOVIBOND, OF SALISBURY, ENGLAND.

TINTOMETER.

SPECIFICATION forming part of Letters Patent No. 451,828, dated May 5, 1891.

Application filed November 7, 1890. Serial No. 370,612. (No model.)

*To all whom it may concern:*

Be it known that I, JOSEPH WILLIAMS LOVIBOND, brewer, maltster, and wine and spirit merchant, of 26 St. Ann Street, Salisbury, in the county of Wilts, England, have invented a new and useful instrument for ascertaining the color-intensity and superficial texture or structure of transparent or opaque matter and for testing color-vision and light-perceptive power, of which the following is a full, clear, and exact description.

My invention relates to improvements in the "tintometer" or optical instrument for use in the examination of translucent matter for color-intensity and of opaque matter for superficial color structure or texture for which previous Letters Patent of the United States were granted to me, dated May 31, 1887, No. 363,835. Such instrument is monocular; and my present improvements consist, first, in making the said instrument binocular, so as to afford a better view of the matter under examination and of the standard to which it is referred; secondly, to render the instrument available for the purpose of testing color-vision and light-perceptive power of the human eye.

The instrument is provided with two eye pieces or apertures both commanding the same field of view when used for the purposes of a tintometer for the measurement of color-intensity and the like, the said apertures being of such form that no lateral adjustment is required in order to suit different distances between the eyes of different observers.

The instrument is readily convertible to the purposes of a color-vision and light-perceptive-power tester by the insertion of a removable division by which the two eye-pieces are made to command separate fields of view, which may either be wholly distinct or partly distinct and partly common to both eye-pieces, as may be required, for ascertaining and measuring defective color-vision and light-perceptive power or difference of color-vision and light-perceptive power as between the one eye and the other.

Reference is to be had to the accompanying drawings, forming part of this specification, wherein—

Figure 1 is a horizontal section, Fig. 2 a longitudinal vertical section on line 1 1, Fig. 1, and Fig. 3 an end view, of the instrument. Figs. 4 and 5 are details.

Similar letters of reference denote like parts in all the figures.

Referring to Figs. 1 and 2, which illustrate the instrument as used for the purposes of a tintometer, A is the body of the instrument in the form of a tube of oblong cross-section having one end concavely curved, as at B, the said end being closed, but having the eye-slits $b\ b$ therein, the said slits being horizontal and of just sufficient width to admit of a clear view through the instrument when the eyes are applied as close as possible thereto, the length and distance apart of the slits being such as to suit the different distances between the eyes of different observers without requiring the lateral adjustment usual in binocular instruments. There is also a central aperture $b'$, through which a view of both fields may be had by one eye, so that the instrument may be used monocularly or binocularly at will. The concave form of this end of the instrument enables the eyes of the observer to be placed close to the apertures $b$ and shields the eyes from extraneous light; but it will be obvious that this end of the instrument might be plane and ordinary lateral shields be provided for excluding side light. The other end or field of the instrument is adapted to be divided into two or more apertures at which to view the sample to be examined and the standard with which it is to be compared, the said standard being as before, any multiple of a unit of color-intensity of known value.

The sample, if fluid, would be contained in a gaged bottle by which the thickness of the stratum traversed by the beam of light is known, this bottle being placed in the optical axis of one eye-aperture $b$ and the standard unit tints and multiples thereof are placed in the optical axis of the other eye-aperture. The respective positions occupied by the sample and standards may be denoted by the letters C D. Between the sample and standards is a central removable grooved rack $c$, corresponding to the grooved extensions of the side walls of the tube A, the grooves serving to receive the slides which constitute the standard tints. A diaphragm $d$, (shown separately in perspective view in Fig. 4,) having two apertures $e\ e$, is fitted in the field of the instrument, and this diaphragm might be permanently combined with the rack $c$, as shown in Fig. 4, so as to be removable together. To prevent oblique rays, transmitted or refracted through the sample and standard, being reflected to the eyes of the observer, stops formed by inwardly-projecting ribs $f$ are fixed around the sides of the body A at intervals in its length.

When used for the purpose of a tintometer, the whole field of view containing the sample and standards is commanded by both eyes of the observer; but to adapt the above-described instrument to the purpose of testing color-vision and light-perceptive power a longitudinal central partition $g$ is inserted in grooves $g'$ in the body A of the instrument, whereby the latter is divided into two parallel tubes, respectively, corresponding to the two eye-apertures $b\ b$. When this partition is inserted, the diaphragm $d$ is replaced by another one $d'$, (shown separately in perspective view in Fig. 5,) having three (or more) apertures $e'$, with intervening racks $c\ c'$ to hold the objects and standards opposite the respective apertures of the diaphragm. The central aperture $e'$ is divided diametrically by the partition $g$, so that the field visible to each eye comprises one-half of the said central aperture and the aperture (or apertures) to the right or left thereof, as the case may be. Opposite the central aperture is placed the substance to be compared with the standards of color placed opposite the lateral apertures.

Having now particularly described and ascertained the nature of the said invention and in what manner the same is to be performed, I declare that what I claim is—

1. The herein-described tintometer or instrument for ascertaining the color-intensity of translucent matter, consisting of a single tube having a concave optical end with horizontal sight-slits therein and a removable diaphragm at the object end having two apertures both commanded by each sight-aperture and giving passage to separate beams of light through the matter under examination and through the standard tints to be compared therewith, substantially as specified.

2. The combination, with the herein-described instrument, of the removable longitudinal central partition dividing the body of the instrument into two distinct tubes, and of a removable diaphragm at the object end having three or more apertures, of which the central one is diametrically divided by the partition so as to be partly visible through each tube, while the others are only visible through different tubes, substantially as specified.

The foregoing specification of my instrument for ascertaining the color-intensity and superficial texture or structure of transparent or opaque matter and for testing color-vision and light-perceptive power signed by me this 21st day of October, 1890.

JOSEPH WILLIAMS LOVIBOND.

Witnesses:
BAYARD C. DIXON,
53 *Chancery Lane, Clerk, London.*
JOSEPH LAKE,
17 *Gracechurch St., London, E. C.*